United States Patent
Fitzgerald

(10) Patent No.: US 12,469,508 B2
(45) Date of Patent: *Nov. 11, 2025

(54) INFORMATION EXCHANGE ON MOBILE DEVICES USING AUDIO

(71) Applicant: Capital One Services, LLC, McLean, VA (US)

(72) Inventor: Ian Fitzgerald, Arlington Heights, IL (US)

(73) Assignee: Capital One Services, LLC, McLean, VA (US)

( * ) Notice: Subject to any disclaimer, the term of this patent is extended or adjusted under 35 U.S.C. 154(b) by 194 days.

This patent is subject to a terminal disclaimer.

(21) Appl. No.: 18/467,912

(22) Filed: Sep. 15, 2023

(65) Prior Publication Data

US 2024/0005934 A1    Jan. 4, 2024

Related U.S. Application Data

(63) Continuation of application No. 17/305,270, filed on Jul. 2, 2021, now Pat. No. 11,804,231.

(51) Int. Cl.
*G10L 19/16* (2013.01)
*G06F 3/0482* (2013.01)
(Continued)

(52) U.S. Cl.
CPC .......... *G10L 19/167* (2013.01); *G06F 3/0482* (2013.01); *G06F 3/165* (2013.01);
(Continued)

(58) Field of Classification Search
CPC .............. G10L 19/167; G10L 19/0204; G10L 19/0216; G10L 19/038; G10L 25/18; G10L 19/018; G06F 3/0482; G06F 3/165
See application file for complete search history.

(56) References Cited

U.S. PATENT DOCUMENTS 8,725,829 B2    5/2014 Wang et al.
9,501,568 B2    11/2016 Rafii
(Continued)

OTHER PUBLICATIONS

Dutta P., et al., "Data Hiding in Audio Signal: A Review," International Journal of Database Theory and Application, Jun. 2009, 8 pages, vol. 2(2), Hannam University, Korea.

(Continued)

*Primary Examiner* — Daniel Pihulic
(74) *Attorney, Agent, or Firm* — Harrity & Harrity, LLP

(57) ABSTRACT

In some implementations, a user device may receive input that triggers transmission of information via sound. The user device may select an audio clip based on a setting associated with the device, and may modify a digital representation of the selected audio clip using an encoding algorithm and based on data associated with a user of the device. The user device may transmit, to a remote server, an indication of the selected audio clip, an indication of the encoding algorithm, and the data associated with the user. The user device may use a speaker to play audio, based on the modified digital representation, for recording by other devices. Accordingly, the user device may receive, from the remote server and based on the speaker playing the audio, a confirmation that users associated with the other devices have performed an action based on the data associated with the user of the device.

20 Claims, 11 Drawing Sheets

(51) Int. Cl.
- *G06F 3/16* (2006.01)
- *G10L 19/02* (2013.01)
- *G10L 19/038* (2013.01)
- *G10L 25/18* (2013.01)

(52) U.S. Cl.
CPC ...... *G10L 19/0204* (2013.01); *G10L 19/0216* (2013.01); *G10L 19/038* (2013.01); *G10L 25/18* (2013.01)

(56) References Cited

U.S. PATENT DOCUMENTS

| | | | |
|---|---|---|---|
| 10,846,334 B2 | 11/2020 | Roberts et al. | |
| 11,354,532 B1 | 6/2022 | Stancil et al. | |
| 11,804,231 B2* | 10/2023 | Fitzgerald | G06F 3/0482 |
| 2012/0087514 A1 | 4/2012 | Williams et al. | |
| 2014/0172141 A1 | 6/2014 | Mangold | |
| 2014/0244514 A1* | 8/2014 | Rodriguez | G06Q 20/227 |
| | | | 348/150 |
| 2019/0287513 A1 | 9/2019 | Alameh et al. | |
| 2020/0082835 A1 | 3/2020 | Coover et al. | |
| 2021/0075772 A1 | 3/2021 | Tew et al. | |
| 2023/0005491 A1* | 1/2023 | Fitzgerald | G10L 19/0204 |
| 2023/0112622 A1 | 4/2023 | Jun | |
| 2024/0005934 A1* | 1/2024 | Fitzgerald | G10L 19/038 |

OTHER PUBLICATIONS

El-Khamy S.E., et al., "A Security Enhanced Robust Audio Steganography Algorithm for Image Hiding Using Sample Comparison in Discrete Wavelet Transform Domain and RSA Encryption," Multimedia Tools and Applications, 2017, pp. 24091-24106.

Kanchan C., et al., "A Survey on Recent Trends in Audio Steganography," International Journal of Engineering Technology and Applied Science, Dec. 2015, 5 pages, vol. 1(6), Afyon Kocatepe University, Turkey.

Kaur N., et al., "A Survey on Various Types of Steganography and Analysis of Hiding Techniques," International Journal of Engineering Trends and Technology, 2014, vol. 11(8), pp. 388-392.

Popa R., "An Analysis of Steganographic Techniques," The Politehnica University of Timisoara, Faculty of Automatics and Computers, Department of Computer Science and Software Engineering, 1998, 65 pages.

* cited by examiner

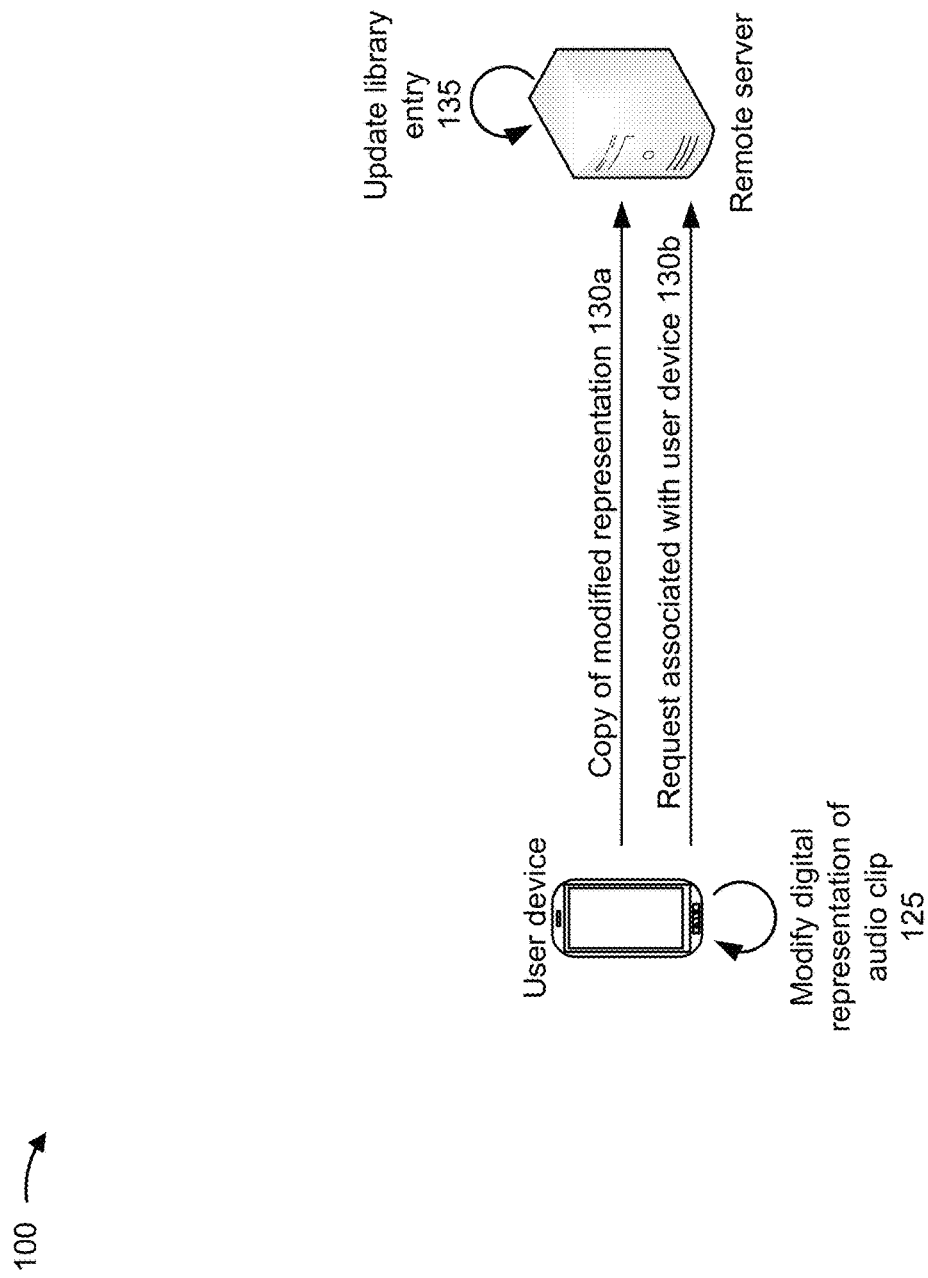

INFORMATION EXCHANGE ON MOBILE DEVICES USING AUDIO

RELATED APPLICATION

This application is a continuation of U.S. patent application Ser. No. 17/305,270, filed Jul. 2, 2021, entitled "INFORMATION EXCHANGE ON MOBILE DEVICES USING AUDIO," which is incorporated herein by reference in its entirety.

BACKGROUND

Mobile devices, such as a wireless communication device, a user equipment (UE), a mobile phone, a laptop computer, a tablet computer, or a handheld computer, among other examples, sometimes exchange information with each other. These devices may exchange information with each other in order to facilitate communicate between users of the devices, transactions between users of the devices, and other interactions. In order to exchange information, the devices may use a network (such as a WiFi network, the Internet, and/or another network) or may exchange information directly.

SUMMARY

In some implementations, a system for conveying information to one or more other devices using audio includes one or more memories and one or more processors, communicatively coupled to the one or more memories. The one or more processors are configured to receive at least a first portion of information and a second portion of information for transmission to the one or more other devices, wherein the first portion of information includes an identifier associated with a user of the system; select an audio clip based on a preference associated with the user; modify a digital representation of the audio clip to encode the first portion of information and the second portion of information within the digital representation, wherein the digital representation includes a spectrogram associated with the audio clip; transmit, to a remote server, a copy of the modified digital representation, a copy of the first portion of information and the second portion of information, and an indicator of an association between the modified digital representation and the first portion of information and the second portion of information; use at least one speaker associated with the system to play audio, based on the modified digital representation, for recording by the one or more other devices; and receive, from the remote server and based on the at least one speaker playing the audio, a confirmation that users associated with the one or more other devices have performed an action based on the first portion of information and the second portion of information.

In some implementations, a method of conveying information to one or more other devices using audio includes receiving, at a device, input that triggers transmission of information via sound; selecting an audio clip from a plurality of stored audio clips, based on a setting associated with the device; modifying a digital representation of the selected audio clip using at least one encoding algorithm and based on data associated with a user of the device; transmitting, to a remote server, an indication of the selected audio clip, an indication of the at least one encoding algorithm, and the data associated with the user of the device; using at least one speaker associated with the device to play audio, based on the modified digital representation, for recording by the one or more other devices; and receiving, from the remote server and based on the at least one speaker playing the audio, a confirmation that users associated with the one or more other devices have performed an action based on the data associated with the user of the device.

In some implementations, a non-transitory computer-readable medium stores a set of instructions for conveying information to at least one other device using audio. The set of instructions includes one or more instructions that, when executed by one or more processors of a device, cause the device to receive data associated with a user of the device; modify a digital representation of an audio clip to encode the data within the digital representation; transmit, to a remote server, a copy of the modified digital representation, a copy of the data, and an indicator of an association between the modified digital representation and the data; use at least one speaker associated with the device to play audio, based on the modified digital representation, for recording by the at least one other device; and receive, from the remote server and based on the at least one speaker playing the audio, a confirmation that at least one user associated with the at least one other device has performed an action based on the data.

BRIEF DESCRIPTION OF THE DRAWINGS

FIGS. 1A-1E are diagrams of an example implementation relating to exchanging information on mobile devices using audio.

DETAILED DESCRIPTION

Figure 1A:
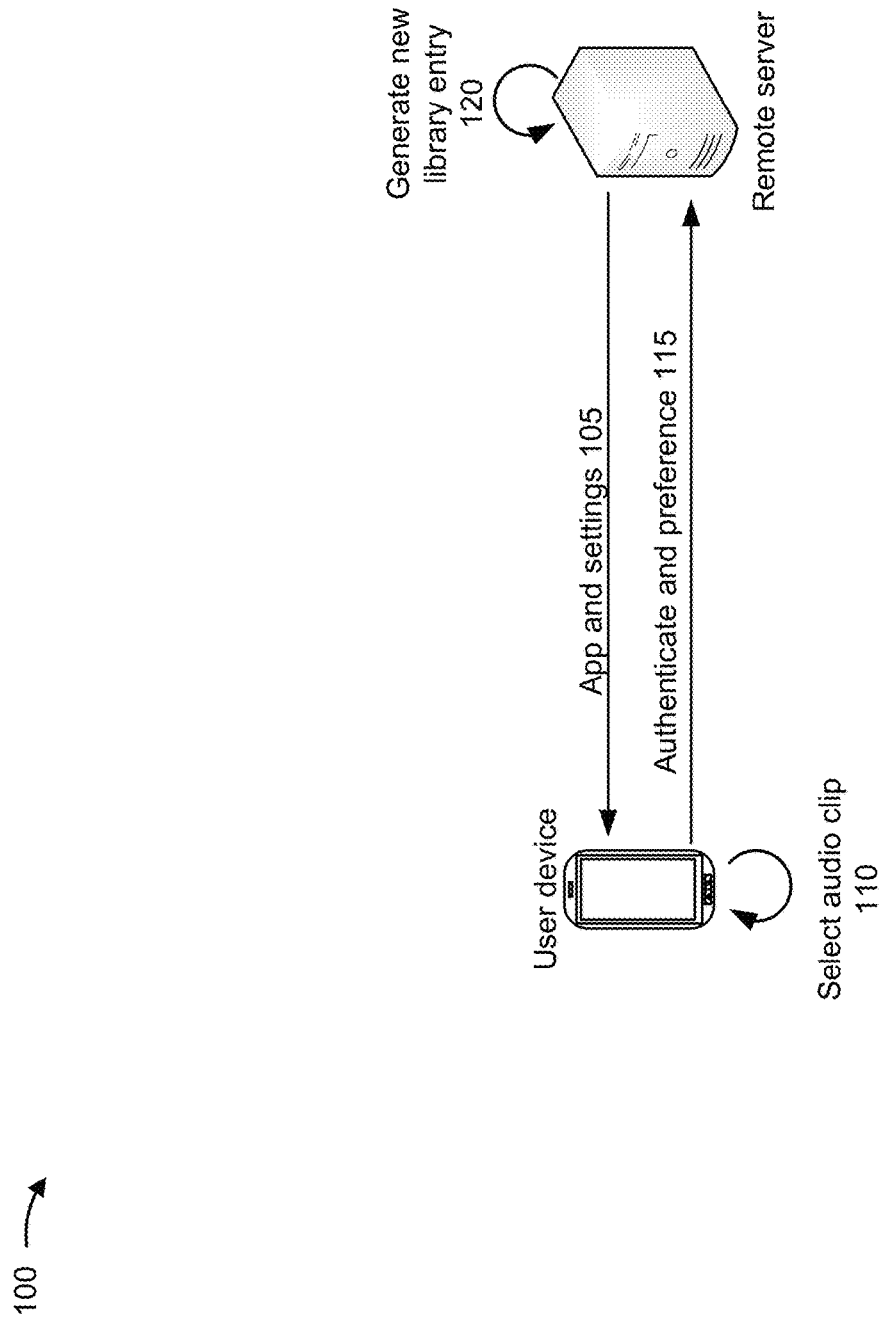

The following detailed description of example implementations refers to the accompanying drawings. The same reference numbers in different drawings may identify the same or similar elements.

Usually, when mobile devices exchange information with each other, the mobile devices use a network (such as a WiFi network, the Internet, and/or another network). For example, one mobile device may transmit the information to an email server, a cloud service, a cellular base station, or another remote device, such that the information is received by another mobile device from the remote device. However, this process incurs significant latency. Accordingly, some mobile devices are configured to exchange information directly without an intervening network. For example, one mobile device may use near-field communication (NFC), Bluetooth®, or other short-wave communication to transmit information to another mobile device. However, these short-range radio signals are prone to blockages and interference, and generating and receiving short-range radio signals requires more processing resources and power than communications with cellular networks and wireless local area networks (WLANs). In another example, one mobile device may generate a Quick Response (QR) code or other visual representation of the information such that another mobile device may capture the visual representation (e.g., with a camera or other optical sensor) in order to receive the information. However, optical sensors require even more processing resources and power than generating and receiving short-range radio signals.

Some implementations described herein use audio to facilitate exchange of information across mobile devices. For example, a transmitting mobile device may modify a digital representation of an audio clip (e.g., using one or more encoding algorithms described herein) in order to embed indicators of the information within the digital representation. A speaker associated with the transmitting mobile device may play audio based on the modified digital representation such that a microphone associated with a receiving mobile device may record the audio. Accordingly, the receiving mobile device may decode the indicators of the information within the recorded audio. This exchange of audio is less sensitive to blockages and interferences than short-range radio signals, which increases accuracy and decreases latency in transmitting the information. Further, retransmissions are generally reduced, which conserves processing resources and power at both user devices.

In order to further reduce processing resources and power consumed by the receiving mobile device, the transmitting mobile device may indicate the modified digital representation to a remote server. Accordingly, the receiving mobile device may contact the remote server such that the remote server provides the information to the receiving mobile device based on the recorded audio. This further reduces processing resources and power that the receiving mobile device would otherwise use to decode the indicators of the information within the recorded audio. By using the remote server to map the embedded indicators to the information, the transmitting mobile device also does not have to encode the information directly into the digital representation but instead may encode the indicators, which are smaller in size and thus conserve processing resources and power at the transmitting mobile device.

The remote server may dynamically update mappings between different indicators and different information as different transmitting user devices begin and end audio transmissions to receiving user devices. This allows for transmitting user devices to modify the information to be transmitted, and even modify the audio clip to be used, significantly faster than if the remote server were to use a static or semi-static library of mappings. Additionally, a dynamic library of mappings conserves memory and processing resources at the remote server, as well as speeding up how quickly the remote server can provide information to receiving user devices, as compared with a static or semi-static library, which would be larger and slower to search. The dynamic library also further conserves processing resources and power at the receiving mobile device by allowing smaller indicators to be embedded in the digital representation. Because the dynamic library is smaller than a static or semi-static library, the transmitting user device may use smaller indicators that are still unique within the dynamic library.

FIGS. 1A-1E are diagrams of an example 100 associated with exchanging information on mobile devices using audio. As shown in FIGS. 1A-1E, example 100 includes a remote server, a user device, and one or more other devices (e.g., nearby user devices). These devices are described in more detail in connection with FIGS. 3 and 4.

As shown in FIG. 1A and by reference number 105, the remote server may transmit and the user device may receive, an app (e.g., an executable or another file or files) that includes compiled machine code and/or object code that, when executed by the user device, causes the user device to perform processes as described herein. In some implementations, the user device may request the app from an app store (or other repository implemented on the remote server) based on input from a user of the user device. For example, the user may select (e.g., using a touchscreen, a keyboard, or another input device) a visual indicator associated with the app on a screen associated with the app store such that the user device requests the app from the remote server.

As further shown by reference number 105, the user device may additionally receive an indication (e.g., at least one indication) of settings (e.g., one or more settings) that are selectable by the user device. Each setting may include a data structure that can be set to a selected value from a plurality of possible values. In one example, the user device may receive an indication of a plurality of audio clips that are selectable by the user device.

As shown by reference number 110, the user device may select from the plurality of audio clips. For example, the user device may display to the user visual indicators associated with the plurality of audio clips, and may receive from the user (e.g., using a touchscreen, a keyboard, or another input device) a selection from the plurality of audio clips. Although described herein as displaying visual indicators and receiving tactile input from the user, the user device may additionally or alternatively play audio indicators and/or receive voice input from the user.

Accordingly, the user device may store (e.g., on a memory) an indication of the selected audio clip as a setting associated with the user device. For example, the user device may store (in a relational database, a graphical database, or other linked data structure) the selection in association with an identifier (e.g., a device ID, a nickname, or another identifier) associated with the user device. Additionally, or alternatively, the user device may store (e.g., on a memory) an indication of the selected audio clip as a preference associated with the user. A preference may include an indicator of a selected value from a plurality of possible values for a corresponding setting. Accordingly, in one example, the user device may store (in a relational database, a graphical database, or other linked data structure) the selection in association with an identifier (e.g., a username, a nickname, or another identifier) associated with the user.

Additionally, or alternatively, the user device may receive, from the user, a file (e.g., at least one file) encoding the selected audio clip. For example, the user may select (e.g., using a touchscreen, a keyboard, or another input device) a visual indicator associated with the file, out of a plurality of files stored on a memory of the user device, such that the user device receives the file as the selected audio clip.

Accordingly, the user device may store (e.g., on a memory) an indicator associated with the file as a setting associated with the user device. For example, the user device may store (in a relational database, a graphical database, or other linked data structure) the indicator (e.g., a file name, a hash value, or another indicator) in association with an identifier associated with the user device. Additionally, or alternatively, the user device may store (e.g., on a memory) an indicator associated with the file as a preference associated with the user. Accordingly, in one example, the user device may store (in a relational database, a graphical database, or other linked data structure) the indicator (e.g., a file name, a hash value, or another indicator) in association with an identifier associated with the user.

As shown by reference number 115, the user device may authenticate itself with the remote server. In some implementations, the user device may provide a username, a password, a passcode, a key, a certificate, and/or another portion of information used to identify the user device (and/or the user) to the remote server. For example, the user device may retrieve (e.g., from a memory) information used to authenticate the user device, and/or the user may input (e.g., using a touchscreen, a keyboard, or another input device) information used to authenticate the user. Accordingly, the remote server may transmit, and the user device may receive, confirmation after the remote server completes authentication. Otherwise, the user device may prompt the user for new input in response to the remote server transmitting an indication that authentication did not complete.

Additionally, or alternatively, and as further shown by reference number 115, the user device may transmit, and the remote server may receive, an indication (e.g., one or more indications) of a setting (e.g., one or more settings) associated with the user device and/or a preference (e.g., one or more preferences) associated with the user. In some implementations, the user device may transmit, and the remote server may receive, an indication of the selected audio clip. For example, the user device may transmit one or more bits indicating a selection from a plurality of audio clips provided by the remote server (e.g., as described above), an indicator associated with a file including the selected audio clip (e.g., as described above), or a copy of the file including the selected audio clip.

As shown by reference number 120, the remote server may generate, in a library (e.g., in a relational database, a graphical database, or another linked data structure) a new entry that associates the indication of the selected audio clip with an identifier associated with the user device and/or an identifier associated with the user. Accordingly, the remote server may use the library to determine a size for an eventual identifier to be encoded within the selected audio clip, as described in further detail below. Alternatively, the remote server may refrain from generating the new entry until the user device requests to transmit information via audio (e.g., as described in further detail below), in order to conserve memory, processing resources, and power.

The user device may receive input that triggers transmission of information via sound. For example, the input may include a request to transmit information via audio. In some implementations, the user may select (e.g., using a touchscreen, a keyboard, or another input device) a button or another visual indicator that triggers transmission of information to nearby devices (e.g., at least one other device or one or more other devices) via audio.

In some implementations, the user device may additionally receive data associated with the user of the device. For example, the user device may retrieve (e.g., from a memory) at least some of the data and/or may receive input from the user (e.g., using a touchscreen, a keyboard, or another input device) indicating at least some of the data. In some implementations, the data associated with the user may be based, at least in part, on the input that triggers transmission. For example, the user may input at least some of the data. The data may include, or at least be associated with, information for transmission to the nearby devices, such as a first portion of information that includes an identifier associated with a user of the system and a second portion of information. For example, the user may be requesting that users associated with the nearby devices perform an action based on the first portion of information and the second portion of information. Additionally, or alternatively, the data may include an identifier associated with the user and an amount associated with a request from the user. For example, the user may be requesting a transaction from the users associated with the nearby devices based on the amount.

In response to the input that triggers transmission of information via sound, the user device may select an audio clip based on a setting associated with the device and/or a preference associated with the user. In one example, the user device may select the audio clip from a plurality of audio clips (e.g., provided by the remote server) based on the setting and/or the preference. In another example, the user device may retrieve (e.g., from a memory) a file including the audio clip based on the setting and/or the preference. Alternatively, the user device may select a default audio clip provided by the remote server.

In any of the examples described above, the user device may transmit, and the remote server may receive, a request for the preference and/or the setting. In some implementations, the request may include a credential (e.g., at least one credential) associated with the user. Alternatively, the user device may authenticate itself (e.g., as described above) during or before transmitting the request. Accordingly, the remote server may transmit, and the user device may receive, based on the request, an indication of the preference and/or the setting. Accordingly, the user device may conserve memory by not storing the preference and/or the setting locally. In some implementations, the remote server may further transmit, and the user device may receive, a file including the audio clip to select such that the user device conserves additional memory.

Accordingly, as shown in FIG. 1B and by reference number 125, the user device may modify a digital representation of the selected audio clip using an encoding algorithm (e.g., at least one encoding algorithm) and based on the data associated with the user. In some implementations, the user device may modify the digital representation to encode the data within the digital representation. As an alternative, the user device may modify the digital representation to encode a plurality of bits that are used to identify the data associated with the user. In some implementations, the user device may generate the plurality of bits based at least in part on a setting associated with the remote server. For example, the remote server may determine a quantity of bits (e.g., a minimum or a minimum plus additional error bits) sufficient to identify the user, out of a plurality of users registered with the remote server, with a threshold level of certainty. Additionally, or alternatively, the quantity of bits may be sufficient to identify the second portion of information (e.g., the amount associated with a request from the user), out of a plurality of possible values, with a threshold level of certainty. Accordingly, the remote server may indicate the quantity of bits to the user device or may indicate variables (e.g., one or more variables), as described above, that the user device may use to determine the quantity of bits. By encoding a quantity of bits to identify the data associated with the user rather than encoding the data itself, the user device may conserve processing resources and power, as well as reduce noticeable distortion to the selected audio clip. In some implementations, the remote server may use a quantity of entries in the library, as described above, to determine the plurality of users registered with the remote server.

Figure 2A:
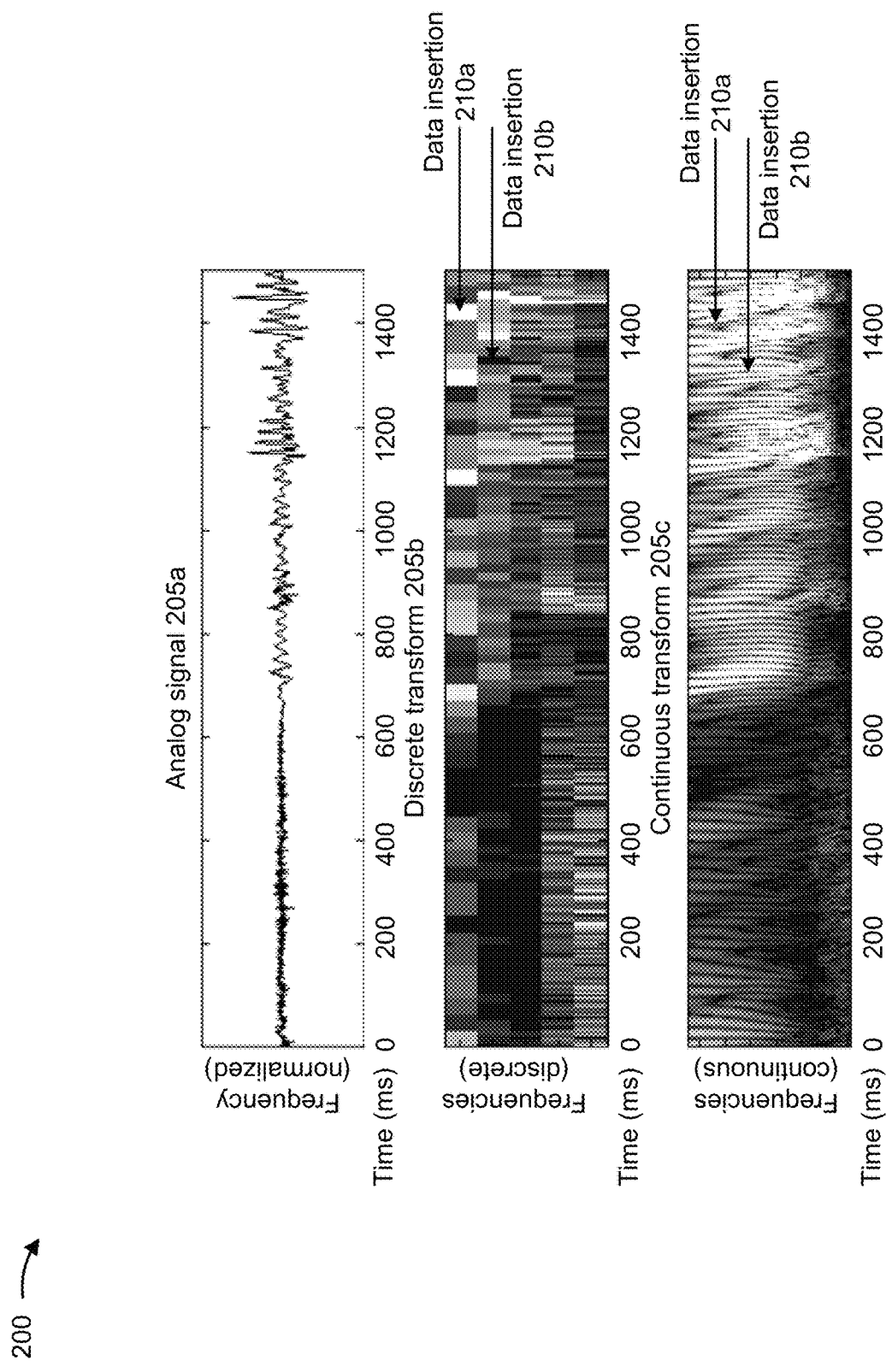
FIGS. 2A-2C are diagrams of example encoding algorithms relating to exchanging information on mobile devices using audio.

In one example, and as described in further detail with respect to FIG. 2A, the user device may perform a discrete wavelet transform (DWT) associated with embedding vectors (e.g., one or more vectors), that encode the data associated with the user (or an indication of that data), within subbands (e.g., one or more subbands) associated with the selected audio clip. Accordingly, in one example, the digital representation may include a spectrogram such that the user device applies a wavelet transform to obtain the spectrogram associated with the audio clip, selects the subbands within the spectrogram that satisfy a threshold (e.g., subbands that are not too strong and/or subbands that are not too weak, in order to reduce noticeable distortion to the selected audio clip), and embeds a vector (e.g., at least one vector) encoding the data associated with the user within the subbands.

Figure 2B:
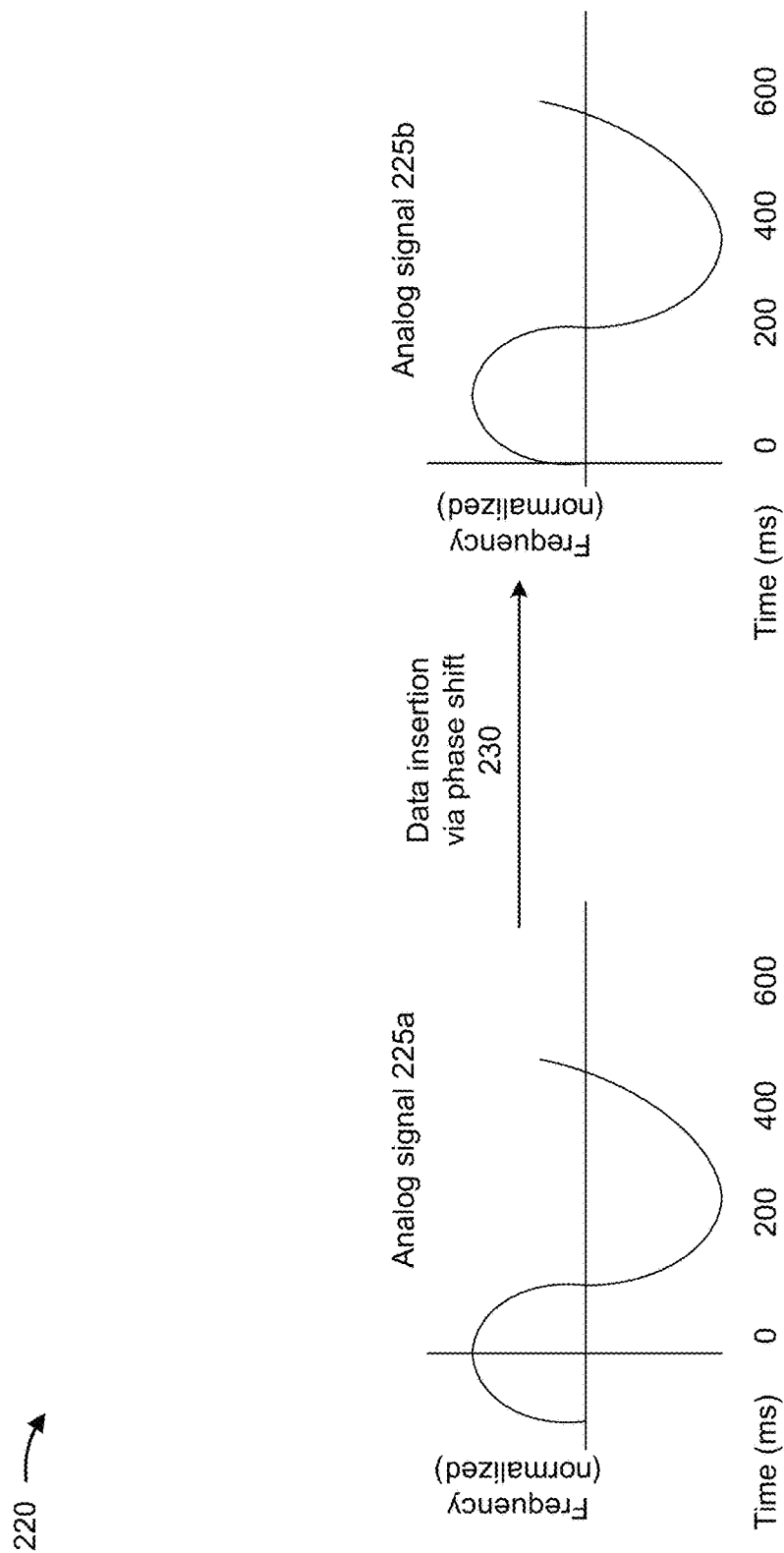

Additionally, or alternatively, and as described in further detail with respect to FIG. 2B, the user device may use a phase coding algorithm associated with shifting initial phases (e.g., one or more initial phases) corresponding to segments (e.g., one or more segments) of the selected audio clip such that additional phases (e.g., one or more additional phases) included in each segment are shifted to maintain a relative difference with the initial phase for the segment. For example, the user device may apply a wavelet transform to obtain the segments and then shift the initial phases of those segments to encode the data associated with the user (or an indication of that data).

Figure 2C:
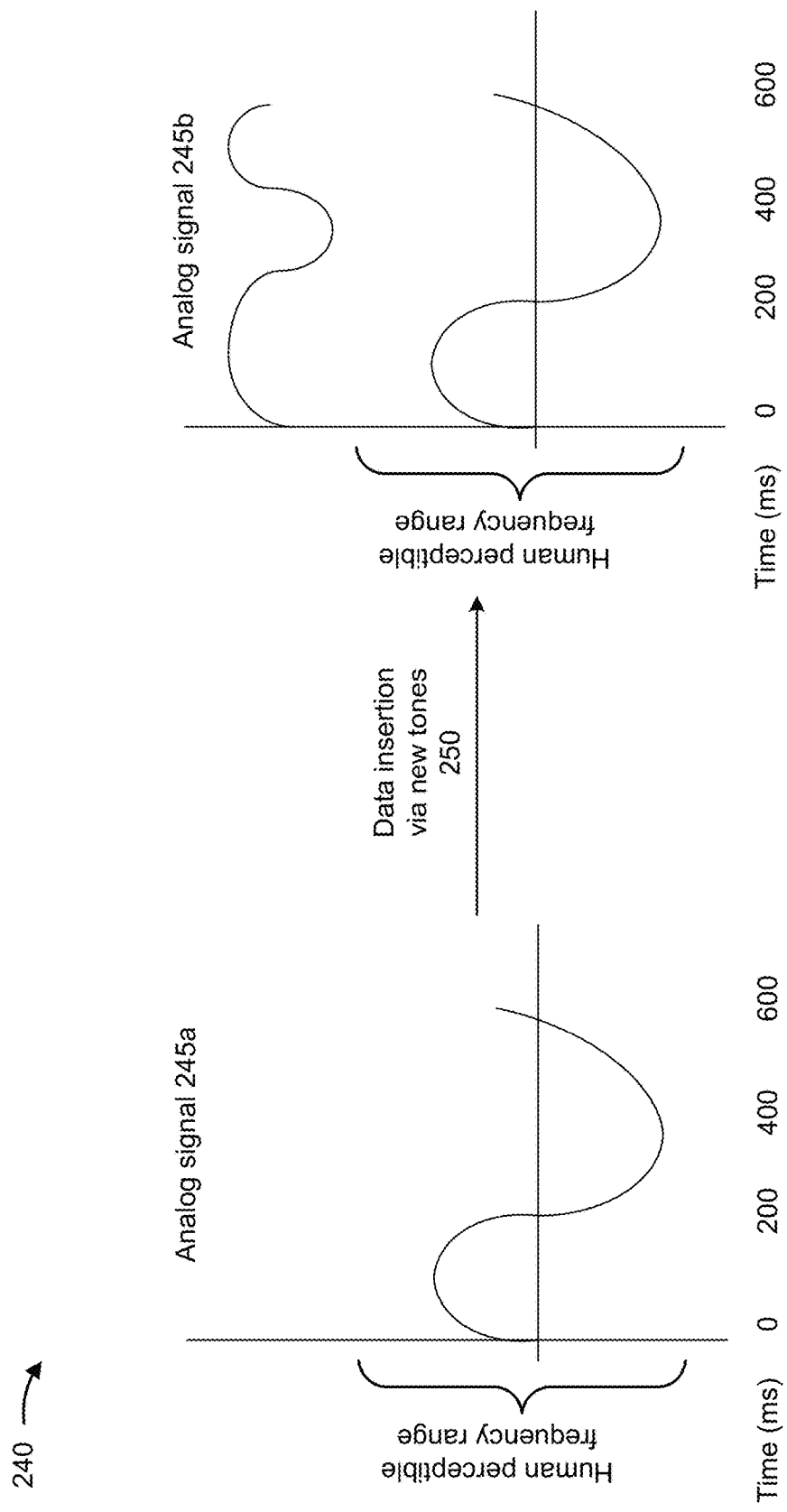

Additionally, or alternatively, and as described in further detail with respect to FIG. 2C, the user device may apply a tone insertion algorithm associated with inserting a tone within the selected audio clip such that the tone encodes the data associated with the user of the device (or an indication of that data). In some implementations, to reduce noticeable distortion to the selected audio clip, a frequency range associated with the tone is not within a range of frequencies associated with human hearing. For example, the user device may encode tones that can be played by a speaker (e.g., at least one speaker) associated with the user device but are not within the range associated with human hearing, such as tones between 19 kHz and 21 kHz, tones between 1 Hz and 21 Hz, and/or another similar range.

Additionally, or alternatively, the user device may use other encoding algorithms. For example, the user device may apply a spread spectrum algorithm associated with addition of a spread data sequence, that includes a noise sequence and a carrier sequence encoding the data associated with the user of the device (or an indication of that data), to a frequency spectrum (e.g., a fast Fourier transform (FFT) output) associated with the selected audio clip. In another example, the user device may apply an echo hiding algorithm such that an echo encoding the data associated with the user of the device (or an indication of that data) is inserted into the selected audio clip. In order to reduce noticeable distortion to the selected audio clip, the echo may be inserted with a small (e.g., less than a threshold) volume and/or in a frequency range that is not within a range of frequencies associated with human hearing (e.g., as described above).

As shown by reference number 130a, the user device may transmit, and the remote server may receive, a copy of the modified digital representation. Additionally with the copy, the user device may transmit, and the remote server may receive, a copy of the data associated with the user along with an indicator of an association between the modified digital representation and the data (e.g., a relational flag, a graphical link, and/or another type of association indicator). Accordingly, the remote server may map the modified digital representation (and thus the data and/or the indication encoded therein) to the data associated with the user (e.g., on behalf of nearby devices, as described in further detail below). This conserves processing resources and power as compared with fully decoding the data and/or the indication within the modified digital representation.

As an alternative, and as shown by reference number 130b, the user device may transmit, and the remote server may receive, an indication of the selected audio clip and an indication of the encoding algorithm. Additionally with the indications, the user device may transmit, and the remote server may receive, a copy of the data associated with the user along with an indicator of an association between the indications and the data (e.g., a relational flag, a graphical link, and/or another type of association indicator). Accordingly, the remote server may perform the same modification to the digital representation as performed by the user device and then associate the modified digital representation with the data associated with the user. Because the indications are smaller than a copy of the modified digital representation, this conserves network resources and power at the user device and reduces latency in communicating with the remote server as compared with the user device transmitting the copy of the modified digital representation.

In some implementations, the user device transmits the indication of the selected audio clip and at least a portion of the data associated with the user (e.g., the identifier associated with the user) earlier than the indication of the encoding algorithm and a remainder of the data associated with the user (e.g., the amount associated with a request).

As shown by reference number 135, the remote server may update, in the library, the entry that associates the indication of the selected audio clip with the identifier associated with the user device and/or the identifier associated with the user. The remote server may update the entry to indicate the modified digital representation and to associate the modified digital representation with at least a portion of the data associated with the user (e.g., the amount associated with a request) along with the identifier associated with the user device and/or the identifier associated with the user. Alternatively, the remote server may generate a new entry that associates the indication of the modified digital representation with the identifier associated with the user device and/or the identifier associated with the user as well as a remaining portion of the data associated with the user. By dynamically updating the entries in the library to associate the modified digital representation with the data associated with the user, the remote server may be used to transmit the data associated with the user from the user device to nearby devices faster and with less overhead than using visual techniques or short-range radio waves. Additionally, unlike if the remote server were using a static library, the remote server may use the dynamic library to transmit new data from the user device to nearby devices with only seconds between receipt of the new data and requests from the nearby devices for the new data. For example, as described above, the data associated with the user may be based, at least in part, on input from the user that is provided at the same time (or within seconds) of a request to transmit that data to the nearby devices via audio.

Figure 1C:
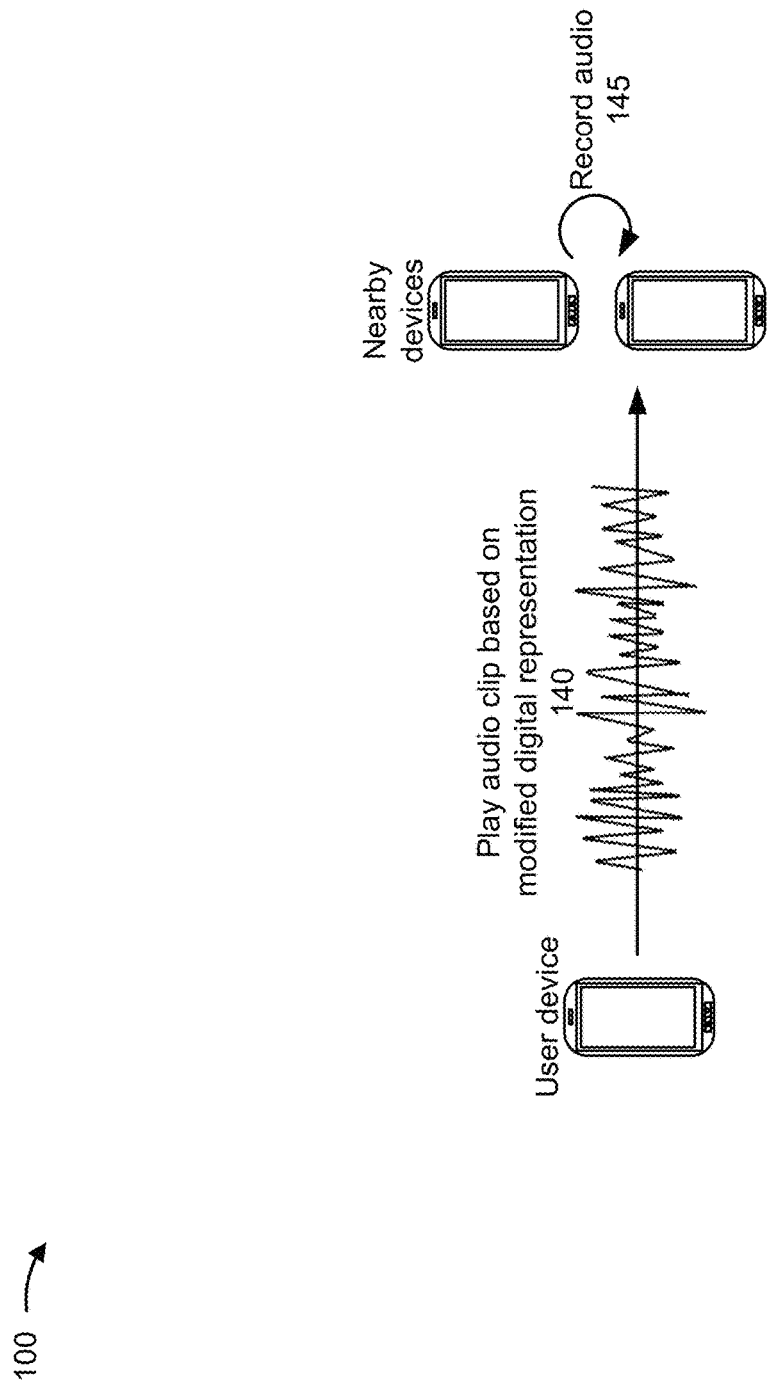

As shown in FIG. 1C and by reference number 140, the user device may use a speaker associated with the user device to play audio, based on the modified digital representation, for recording by the nearby devices. In some implementations, the user device may use the speaker based on a confirmation from the remote server that the library was updated (e.g., as described above). In one example, using the speaker may include outputting, to a driver, the modified digital representation of the selected audio clip such that the modified digital representation is fed to a digital-to-analog converter by the driver. Accordingly, the output from the digital-to-analog converter may drive the speaker to play the audio based on the modified digital representation.

As shown by reference number 145, the nearby devices may use microphones (e.g., one or more microphones)

associated with the nearby devices to record audio in an environment of the nearby devices. In some implementations, the nearby devices may receive inputs that trigger reception of information via sound. For example, the inputs may include requests to receive information via audio. In some implementations, the users associated with the nearby devices may select (e.g., using touchscreens, keyboards, or other input devices) buttons or other visual indicators that trigger reception of information from a nearby device (e.g., the user device) via audio. In one example, using the microphone may include receiving, from a driver, a digital representation of the recorded audio, where the digital representation is from an analog-to-digital converter controlled by the driver and driven by the microphone. In some implementations, the nearby devices may additionally apply one or more filters (e.g., at a hardware level and/or a software level) to distinguish a portion of the recorded audio transmitted by the user device from ambient noise and/or other background noise also included in the recorded audio. These filters increase an accuracy of mapping the recorded audio to the data (e.g., by the remote server, as described in further detail below) and/or decrease an amount of recorded audio needed by the remote server to map the recorded audio to the data with a threshold level of certainty. Accordingly, the filters conserve processing resources and power at the nearby devices by reducing an amount of data to be transmitted to the remote server and decreasing a latency between recording audio and receiving the corresponding data from the remote server.

Figure 1D:
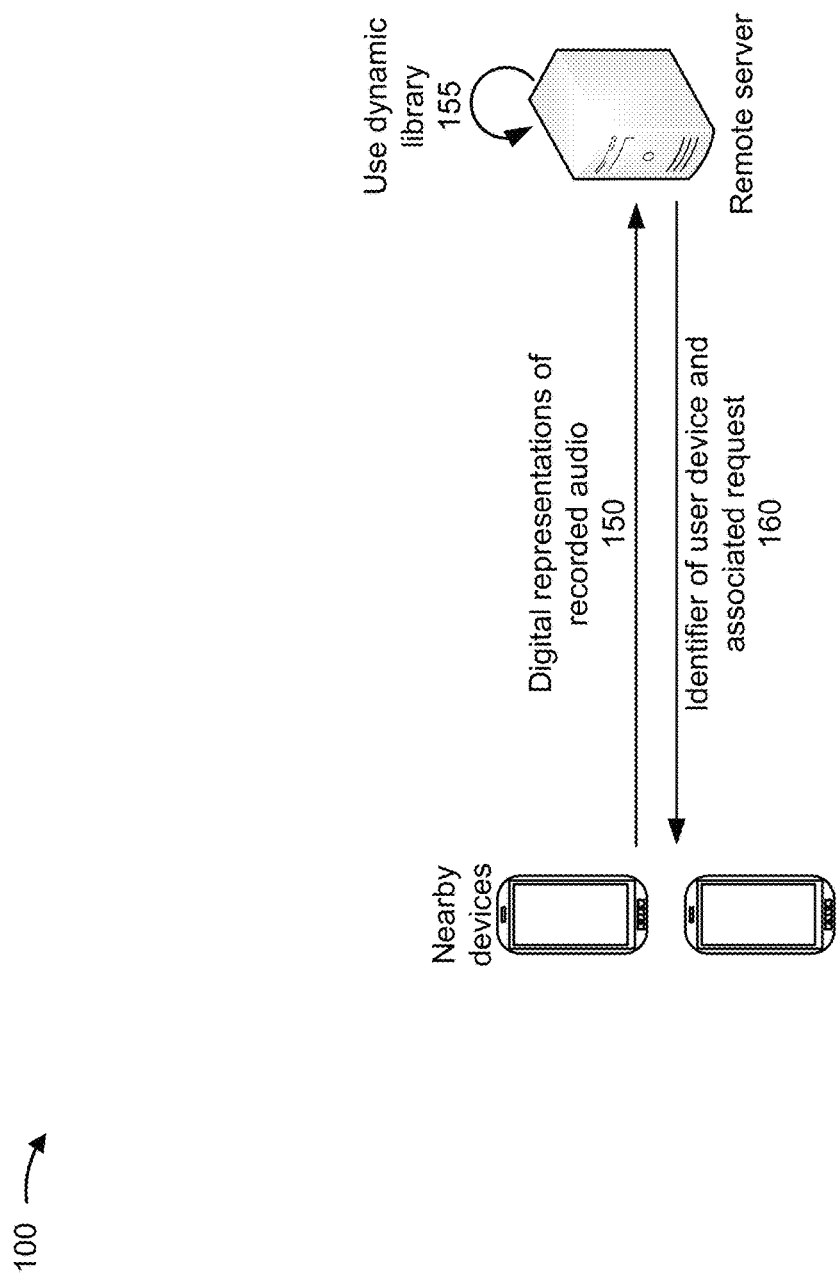

As shown in FIG. 1D and by reference number 150, the nearby devices may transmit, and the remote server may receive, digital representations of the recorded audio. In some implementations, the nearby devices may store segments of the audio as recording occurs, generate digital representations of those segments, and transmit the digital representations to the remote server (e.g., with an application programming interface (API) call and/or another request to identify the data associated with the digital representations). By transmitting the digital representations, the nearby devices conserve network overhead. As an alternative, the nearby devices may transmit the segments to the remote server such that the remote server may generate the digital representations (e.g., spectrograms, phase matrices, discretized signals, and/or other digital repressions) based on the segments. By generating the digital representations, the remote server allows the nearby devices to conserve processing resources and power. In some implementations, the nearby devices may stream the recorded audio to the remote server rather than transmitting segments. By streaming the audio, the nearby devices may receive the data associated with the digital representations faster than if the nearby devices were to transmit segments.

As shown by reference number 155, the remote server may use the library to map the received digital representations to the data associated with the user device. For example, the remote server may perform a fuzzy search within the library based on the digital representations to find entries (e.g., one or more entries) within the library. As used herein, a "fuzzy search" refers to any search within the library that does not rely on a perfect match between the received digital representations and stored digital representations associated with the entries in the library. For example, a fuzzy search may include verifying whether portions of the recorded digital representations (e.g., bits, frequencies, tones, harmonies, and/or other portions) are within threshold measures of corresponding portions of the stored digital representations. In another example, a fuzzy search may include a machine-learning-based engine (e.g., a regression analysis, a decision tree, an artificial neural network, and/or another machine-learning model) to determine similarity scores, between the recorded digital representations and the stored digital representations, that satisfy a similarity threshold. By using a fuzzy search rather than decoding the data (or an indication associated with the data) from the recorded audio, the remote server conserves processing resources and power.

Accordingly, the remote server may identify an entry associated with a stored digital representation that is a closest match to the received digital representations. For example, the stored digital representation may be associated with a highest similarity score and/or other measure of closeness to the received digital representations. In some implementations, when a level of certainty (e.g., an accuracy score and/or another measure of certainty associated with the fuzzy search) does not satisfy a threshold, the remote server may wait for, or may request, additional recorded audio (e.g., additional segments, additional digital representations based on the additional segments, or additional streamed audio) from the nearby devices. Accordingly, the remote server may dynamically update the fuzzy search, and thus the results from and the level of certainty associated with the fuzzy search, as the nearby devices continue to record.

When the remote server identifies the entry that is a closest match, the remote server may transmit, and the nearby devices may receive, the data that is indicated by the entry. In example 100, the data indicated by the entry is the data associated with the user device. Accordingly, as shown by reference number 160, the remote server may transmit the identifier associated with the user device and/or the identifier associated with the user as well as a remaining portion of the data associated with the user (e.g., the amount associated with the request from the user, as described above). By using the remote server, the nearby devices conserve processing resources and power as compared with determining the data associated with the user locally.

Figure 1E:
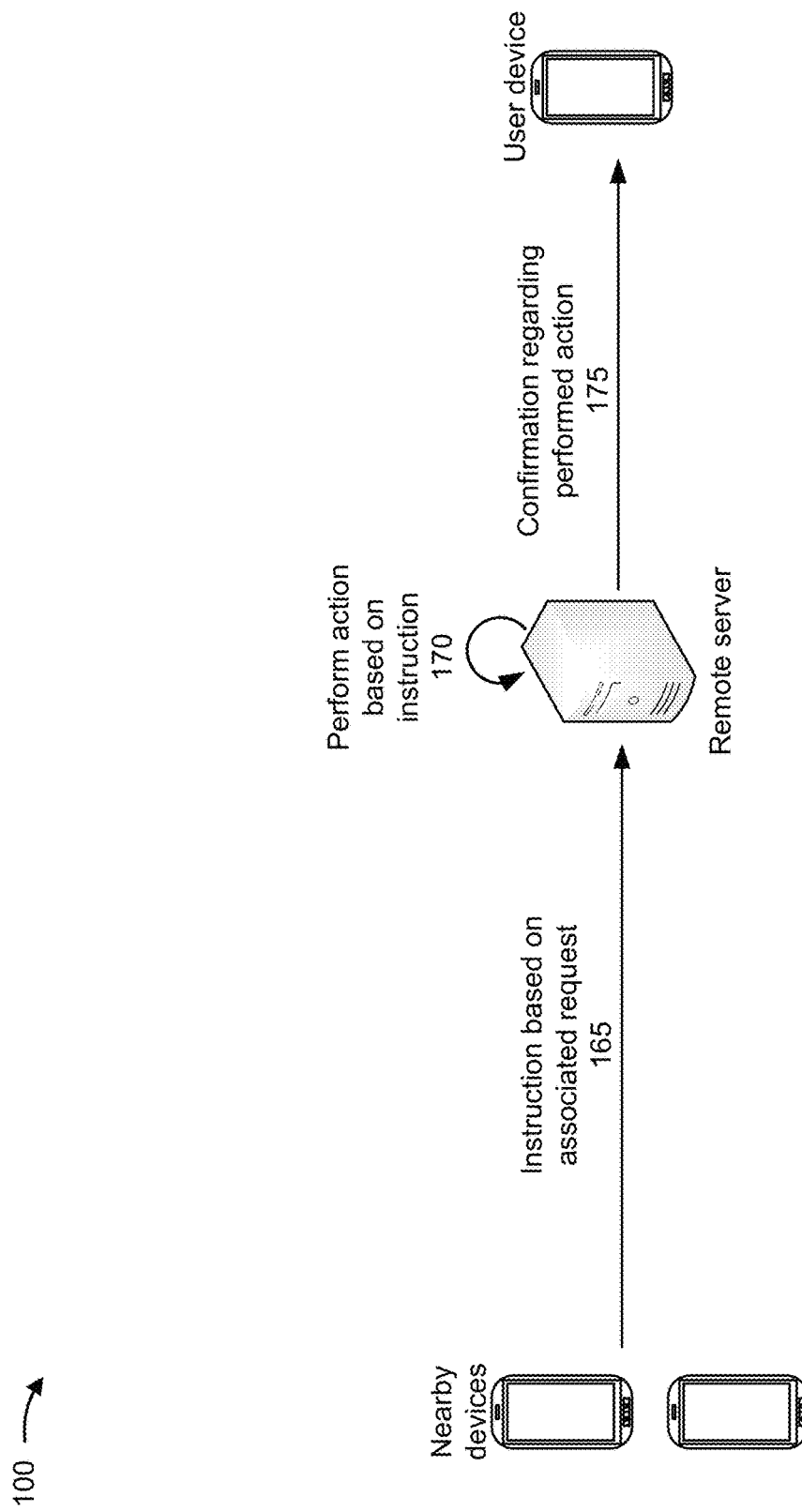

As shown in FIG. 1E and by reference number 165, the nearby devices may transmit, and the remote server may receive, instructions to perform an action based on the data associated with the user (e.g., based on the identifier associated with the user device and/or the identifier associated with the user as well as the amount associated with the request from the user) received from the remote server. For example, the nearby devices may display, to the users of the nearby devices, visual representations based on the data associated with the user (e.g., textual and/or visual representations of the user along with textual representations of the amount), and the users may select (e.g., using a touchscreen, a keyboard, or another input device) buttons or another visual indicators that trigger the action. Accordingly, the nearby devices may use API calls and/or transmit other requests to perform the action, based on the triggers from the users. In some implementations, the action includes a transaction that is associated with the user of the user device and the users of the nearby devices and that is based at least in part on the amount.

As shown by reference number 170, the remote server may perform the action for the nearby devices based on the instructions. For example, the remote server may alter data stored on the remote server and associated with the user of the user device and/or the users associated with the nearby devices in order to complete the action (e.g., altering the data to reflect the transaction). Additionally, or alternatively, the remote server may contact an additional server (e.g., one or more additional servers) via an API call and/or another communication such that the additional server completes the action. In some implementations, the remote server may transmit, and the nearby devices may receive, confirmations that the action was completed.

Additionally, as shown by reference number 175, the remote server may transmit, and the user device may receive, a confirmation that users associated with the nearby devices have performed the action based on the data associated with the user of the device. In some implementations, the user device may display visual indicators (e.g., one or more visual indicators) associated with the confirmation. In some implementations, the confirmation may indicate identifiers (e.g., one or more identifiers) associated with the users of the nearby devices (e.g., usernames, nicknames, or other identifiers). Accordingly, the visual indicators may include textual and/or visual representations of the users.

In order to conserve processing resources and power, the user device may halt playing of the audio using the speaker after a finite amount of time. For example, the user device may halt playing after a threshold amount of time (e.g., preconfigured, such as a default; based on a setting associated with the device; and/or based on a preference associated with the user). Additionally, or alternatively, the user device may halt playing based on a dynamic determination. For example, the user device may halt playing when the confirmation indicates a quantity of users, associated with the nearby devices, that satisfy a threshold. The threshold may be based on an expected quantity of users, which may be input by the user of the user device. Additionally, or alternatively, the user device may dynamically determine the threshold based on detection of a quantity of devices that are within a threshold distance (e.g., based on a percentage of the quantity of devices within the threshold distance, where the percentage is preconfigured, such as a default, or based on historical actions performed by the user). In another example, the user device may receive an instruction to halt playing of the audio and halt playing based on the instructions. For example, the user may select (e.g., using a touchscreen, a keyboard, or another input device) a button or another visual indicator that triggers the instruction.

Accordingly, the user device may use the speaker to halt playing of the audio based on a determination or instruction, as described above. In one example, the user device may instruct the driver to stop providing an analog signal to the speaker based on the modified digital representation.

In order to further conserve memory on the remote server, the user device may transmit, and the remote server may receive, an indication to remove the association between the modified digital representation and the data. For example, the user device may transmit the indication based on halting playing of the audio. Accordingly, the server may update the entry, associated with the user and/or the user device, to remove the modified digital representation and to remove at least some of the data associated with the user (e.g., remove the amount associated with a request from the user). Alternatively, the remote server may remove the entry associated with the user and/or the user device. In addition to conserving memory, this allows the remote server to increase accuracy of other fuzzy searches by reducing a size of the library. The reduced size of the library also allows the remote server to perform other fuzzy searches faster and to reduce a size of indications to be encoded in audio clips for use in the other fuzzy searches, which conserves processing resources and power on other user devices performing the encodings.

By using techniques as described in connection with example 100, the user device may modify the digital representation of the selected audio clip in order to transmit information (e.g., the data associated with the user) to the nearby devices using the modified digital representation. This exchange of audio is less sensitive to blockages and interferences than short-range radio signals, which increases accuracy and decreases latency in transmitting the information. Further, retransmissions are generally reduced, which conserves processing resources and power at both user devices. Additionally, in order to further reduce processing resources and power consumed by the nearby devices, the user device may indicate the modified digital representation to the remote server such that the nearby devices contact the remote server in order to receive the information. This further reduces processing resources and power that the nearby devices would otherwise use to decode recorded audio. In some implementations, by using the remote server, the user device does not have to encode the information directly into the digital representation but instead may encode an indication of the information, which is smaller in size and thus conserves processing resources and power at the user device. Additionally, the remote server may dynamically update mappings between different indicators and different information as different transmitting user devices begin and end audio transmissions, which allows for transmitting user devices to modify the information to be transmitted, and even modify the audio clip to be used, significantly faster than if the remote server were to use a static or semi-static library of mappings. Additionally, in some implementations, a dynamic library of mappings conserves memory and processing resources at the remote server, and speeds up how quickly the remote server can provide information to receiving user devices, as compared with a static or semi-static library, which would be larger and slower to search.

As indicated above, FIGS. 1A-1E are provided as an example. Other examples may differ from what is described with regard to FIGS. 1A-1E.

FIGS. 2A, 2B, and 2C are diagrams of examples 200, 220, and 240, respectively, of encoding algorithms associated with exchanging information on mobile devices using audio. The algorithms of examples 200, 220, and 240 may be implemented by a user device, as shown in FIGS. 1A-1E and as described in more detail in connection with FIGS. 3 and 4.

FIG. 2A shows an example 200 of wavelet transforms associated with embedding vectors in a selected audio clip. For example, the user device may convert an analog signal 205a (that comprises the selected audio clip) to a digital representation, such as a discrete transform 205b and/or a continuous transform 205c. The discrete transform 205b includes discrete subbands, and the continuous transform 205c includes continuous subbands. Accordingly, as shown in FIG. 2A, the transforms may indicate a strength of different frequencies within the selected audio clip (e.g., across time as shown in FIG. 2A).

The user device may therefore select subbands for encoding (e.g., as shown by reference numbers 210a and 210b) and increase or decrease a frequency strength within the selected subbands to encode information in the digital representation. For example, the user device may increase the frequency strength to encode a "1" bit and decrease the frequency strength to encode a "0" bit. In another example, the user device may alter the frequency strength by an amount corresponding to a particular hexadecimal value (or other value). Accordingly, the user device may encode data (or an indication of data) within the selected audio clip.

FIG. 2B shows an example 220 of phase coding a selected audio clip. For example, the user device may discretize the selected audio clip into segments (e.g., one segment is shown as analog signal 225a in FIG. 2B). As shown by reference number 230, the user device may thus shift an initial phase of the segment to encode a bit (e.g., a $\pi/4$ shift to encode a "1" bit or a $-\pi/4$ shift to encode a "0" bit) and shift remaining parts of the segment to align with the shifted initial phase (e.g., resulting in a new segment shown as analog signal 225b in FIG. 2B). Accordingly, the user device may encode data (or an indication of data) within the selected audio clip.

FIG. 2C shows an example 240 of tone insertion within a selected audio clip. For example, the user device may discretize the selected audio clip into segments (e.g., one segment is shown as analog signal 245a in FIG. 2C). As shown by reference number 250, the user device may insert a tone that represents a bit (e.g., a "1" or "0") or a hexadecimal value (or other value) into the segment (e.g., resulting in a new segment shown as analog signal 245b in FIG. 2C). As further shown in FIG. 2C, the inserted tone may be outside a range of frequencies associated with human hearing. Accordingly, the user device may encode data (or an indication of data) within the selected audio clip.

As indicated above, FIGS. 2A-2C are provided as examples. Other examples may differ from what is described with regard to FIGS. 2A-2C.

Figure 3:
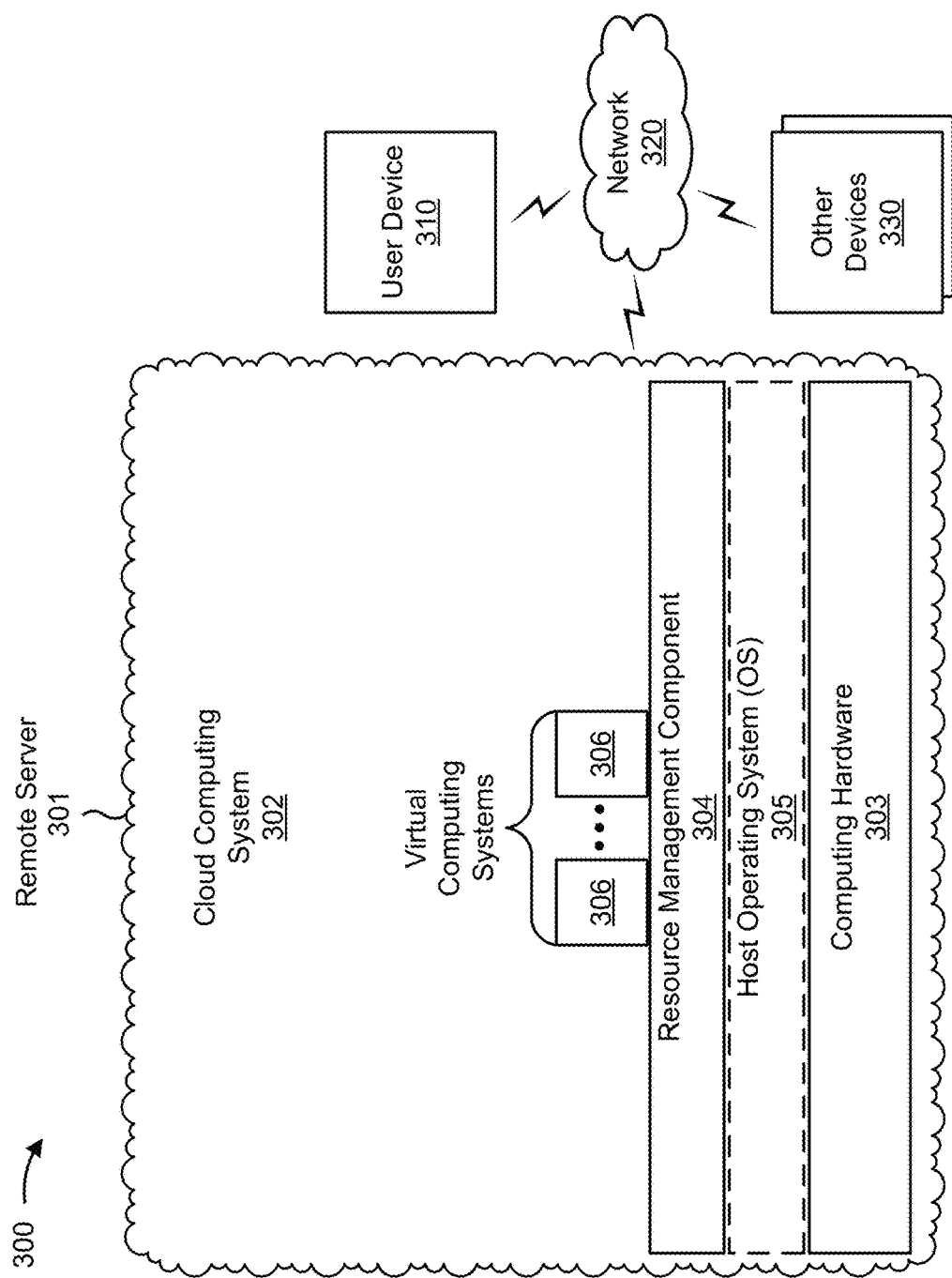
FIG. 3 is a diagram of an example environment in which systems and/or methods described herein may be implemented.

FIG. 3 is a diagram of an example environment 300 in which systems and/or methods described herein may be implemented. As shown in FIG. 3, environment 300 may include a remote server 301, which may include one or more elements of and/or may execute within a cloud computing system 302. The cloud computing system 302 may include one or more elements 303-306, as described in more detail below. As further shown in FIG. 3, environment 300 may include a user device 310, a network 320, and other devices 330. Devices and/or elements of environment 300 may interconnect via wired connections and/or wireless connections.

The cloud computing system 302 includes computing hardware 303, a resource management component 304, a host operating system (OS) 305, and/or one or more virtual computing systems 306. The resource management component 304 may perform virtualization (e.g., abstraction) of computing hardware 303 to create the one or more virtual computing systems 306. Using virtualization, the resource management component 304 enables a single computing device (e.g., a computer, a server, and/or the like) to operate like multiple computing devices, such as by creating multiple isolated virtual computing systems 306 from computing hardware 303 of the single computing device. In this way, computing hardware 303 can operate more efficiently, with lower power consumption, higher reliability, higher availability, higher utilization, greater flexibility, and lower cost than using separate computing devices.

Computing hardware 303 includes hardware and corresponding resources from one or more computing devices. For example, computing hardware 303 may include hardware from a single computing device (e.g., a single server) or from multiple computing devices (e.g., multiple servers), such as multiple computing devices in one or more data centers. Computer hardware 303 may include one or more processors, one or more memories, one or more storage components, and/or one or more networking components, examples of which are described elsewhere herein.

The resource management component 304 includes a virtualization application (e.g., executing on hardware, such as computing hardware 303) capable of virtualizing computing hardware 303 to start, stop, and/or manage one or more virtual computing systems 306. For example, the resource management component 304 may include a hypervisor (e.g., a bare-metal or Type 1 hypervisor, a hosted or Type 2 hypervisor, and/or the like) or a virtual machine monitor, such as when the virtual computing systems 306 are virtual machines. Additionally, or alternatively, the resource management component 304 may include a container manager, such as when the virtual computing systems 306 are containers. In some implementations, the resource management component 304 executes within and/or in coordination with a host operating system 305.

A virtual computing system 306 includes a virtual environment that enables cloud-based execution of operations and/or processes described herein using computing hardware 303. A virtual computing system 306 may execute one or more applications using a file system that includes binary files, software libraries, and/or other resources required to execute applications on a guest operating system (e.g., within the virtual computing system 306) or the host operating system 305.

Although the remote server 301 may include one or more elements 303-306 of the cloud computing system 302, may execute within the cloud computing system 302, and/or may be hosted within the cloud computing system 302, in some implementations, the remote server 301 may not be cloud-based (e.g., may be implemented outside of a cloud computing system) or may be partially cloud-based. For example, the remote server 301 may include one or more devices that are not part of the cloud computing system 302, such as device 400 of FIG. 4, which may include a stand-alone server or another type of computing device. The remote server 301 may perform one or more operations and/or processes described in more detail elsewhere herein.

User device 310 may include one or more devices capable of transmitting information to nearby devices using audio. The user device 310 may include a communication device. For example, the user device 310 may include a wireless communication device, a user equipment (UE), a mobile phone (e.g., a smart phone or a cell phone, among other examples), a laptop computer, a tablet computer, a handheld computer, a desktop computer, a gaming device, a wearable communication device (e.g., a smart wristwatch or a pair of smart eyeglasses, among other examples), an Internet of Things (IoT) device, or a similar type of device. The user device 310 may modify a digital representation of an audio clip and use a speaker to play audio based on the modified digital representation, as described elsewhere herein. Additionally, the user device 310 may communicate with the remote server 301 such that the remote server 301 may map the modified digital representation to data associated with a user of the user device 310, as described elsewhere herein. For example, the remote server 301 may perform the mapping on behalf of other devices 330, as described below.

Network 320 includes one or more wired and/or wireless networks. For example, network 320 may include a cellular network, a public land mobile network (PLMN), a local area network (LAN), a wide area network (WAN), a private network, the Internet, and/or the like, and/or a combination of these or other types of networks. The network 320 enables communication among the devices of environment 300.

Other devices 330 may include one or more devices capable of receiving information from another device using audio. The other devices 330 may include communication devices. For example, the other devices 330 may include wireless communication devices, UEs, mobile phones (e.g., smart phones or cell phones, among other examples), laptop computers, tablet computers, handheld computers, desktop computers, gaming devices, wearable communication devices (e.g., smart wristwatches or pairs of smart eyeglasses, among other examples), IoT devices, or similar types of devices. The other devices 330 may communicate with the remote server 301 such that the remote server 301 may map audio, recorded by the other devices 330, to data associated with a user of another device, as described elsewhere herein. For example, the data may be associated with a user of the user device 310, as described above.

The number and arrangement of devices and networks shown in FIG. 3 are provided as an example. In practice, there may be additional devices and/or networks, fewer devices and/or networks, different devices and/or networks, or differently arranged devices and/or networks than those shown in FIG. 3. Furthermore, two or more devices shown in FIG. 3 may be implemented within a single device, or a single device shown in FIG. 3 may be implemented as multiple, distributed devices. Additionally, or alternatively, a set of devices (e.g., one or more devices) of environment 300 may perform one or more functions described as being performed by another set of devices of environment 300.

Figure 4:
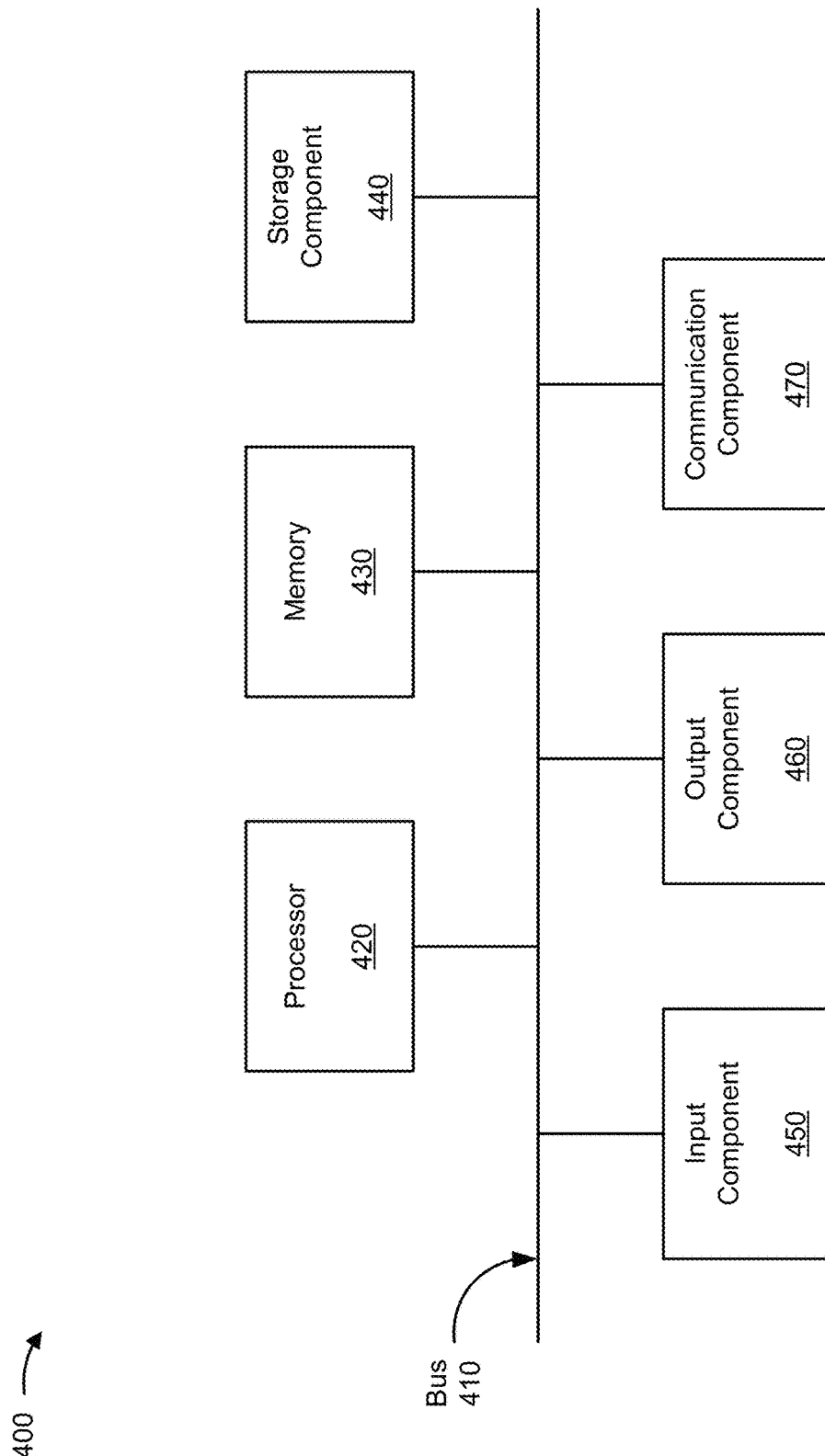
FIG. 4 is a diagram of example components of one or more devices of FIG. 3.

FIG. 4 is a diagram of example components of a device 400, which may correspond to a user device and/or other devices. In some implementations, a user device and/or other devices may include one or more devices 400 and/or one or more components of device 400. As shown in FIG. 4, device 400 may include a bus 410, a processor 420, a memory 430, a storage component 440, an input component 450, an output component 460, and a communication component 470.

Bus 410 includes a component that enables wired and/or wireless communication among the components of device 400. Processor 420 includes a central processing unit, a graphics processing unit, a microprocessor, a controller, a microcontroller, a digital signal processor, a field-programmable gate array, an application-specific integrated circuit, and/or another type of processing component. Processor 420 is implemented in hardware, firmware, or a combination of hardware and software. In some implementations, processor 420 includes one or more processors capable of being programmed to perform a function. Memory 430 includes a RAM, a read-only memory (ROM), and/or another type of memory (e.g., a flash memory, a magnetic memory, and/or an optical memory).

Storage component 440 stores information and/or software related to the operation of device 400. For example, storage component 440 may include a hard disk drive, a magnetic disk drive, an optical disk drive, a solid state disk drive, a compact disc, a digital versatile disc, and/or another type of non-transitory computer-readable medium. Input component 450 enables device 400 to receive input, such as user input and/or sensed inputs. For example, input component 450 may include a touch screen, a keyboard, a keypad, a mouse, a button, a microphone, a switch, a sensor, a global positioning system component, an accelerometer, a gyroscope, and/or an actuator. Output component 460 enables device 400 to provide output, such as via a display, a speaker, and/or one or more light-emitting diodes. Communication component 470 enables device 400 to communicate with other devices, such as via a wired connection and/or a wireless connection. For example, communication component 470 may include a receiver, a transmitter, a transceiver, a modem, a network interface card, and/or an antenna.

Device 400 may perform one or more processes described herein. For example, a non-transitory computer-readable medium (e.g., memory 430 and/or storage component 440) may store a set of instructions (e.g., one or more instructions, code, software code, and/or program code) for execution by processor 420. Processor 420 may execute the set of instructions to perform one or more processes described herein. In some implementations, execution of the set of instructions, by one or more processors 420, causes the one or more processors 420 and/or the device 400 to perform one or more processes described herein. In some implementations, hardwired circuitry may be used instead of or in combination with the instructions to perform one or more processes described herein. Thus, implementations described herein are not limited to any specific combination of hardware circuitry and software.

The number and arrangement of components shown in FIG. 4 are provided as an example. Device 400 may include additional components, fewer components, different components, or differently arranged components than those shown in FIG. 4. Additionally, or alternatively, a set of components (e.g., one or more components) of device 400 may perform one or more functions described as being performed by another set of components of device 400.

Figure 5:
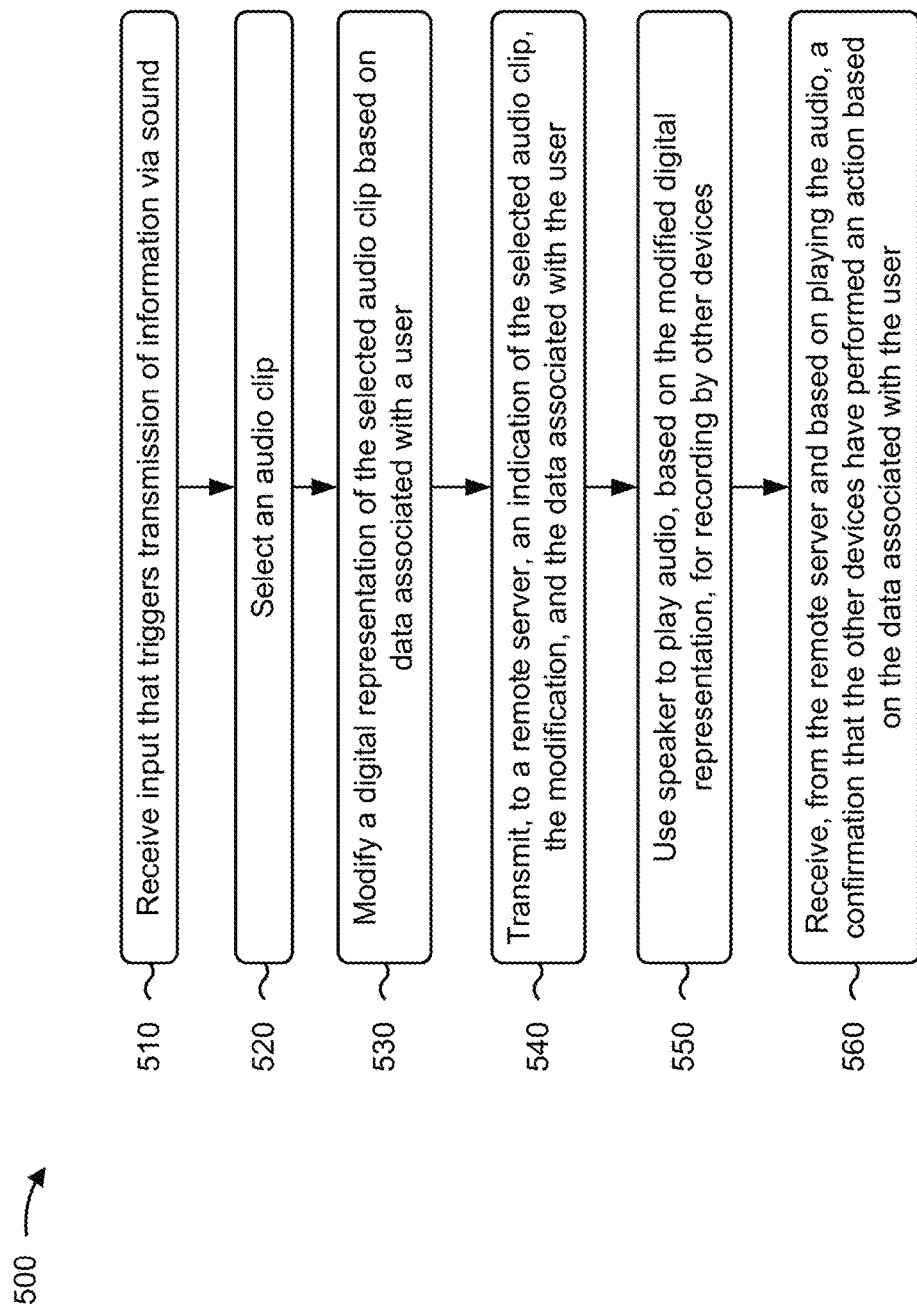
FIG. 5 is a flowchart of an example process relating to exchanging information on mobile devices using audio.

FIG. 5 is a flowchart of an example process 500 associated with information exchange on mobile devices using audio. In some implementations, one or more process blocks of FIG. 5 may be performed by a user device (e.g., user device 310). In some implementations, one or more process blocks of FIG. 5 may be performed by another device or a group of devices separate from or including the user device, such as remote server 301 and/or other devices 330. Additionally, or alternatively, one or more process blocks of FIG. 5 may be performed by one or more components of device 400, such as processor 420, memory 430, storage component 440, input component 450, output component 460, and/or communication component 470.

As shown in FIG. 5, process 500 may include receiving input that triggers transmission of information via sound (block 510). As further shown in FIG. 5, process 500 may include selecting an audio clip (block 520). In some implementations, the user device may select the audio clip based on a setting associated with the user device and/or based on a preference associated a user of the device. In some implementations, the audio clip may be selected from a plurality of stored audio clips. As further shown in FIG. 5, process 500 may include modifying a digital representation of the selected audio clip based on data associated with the user of the device (block 530). In some implementations, the user device may modify the digital representation using an encoding algorithm (e.g., as described above in connection with FIGS. 2A-2C). As further shown in FIG. 5, process 500 may include transmitting, to a remote server, an indication of the selected audio clip, an indication of the modification, and the data associated with the user (block 540). For example, the user device may transmit the modified digital representation or an indication of the encoding algorithm. As further shown in FIG. 5, process 500 may include using a speaker associated with the device to play audio, based on the modified digital representation, for recording by other devices (block 550). As further shown in FIG. 5, process 500 may include receiving, from the remote server and based on the speaker playing the audio, a confirmation that users associated with the other devices have performed an action based on the data associated with the user of the device (block 560). For example, the action may include a transaction that is associated with the user of the user device and the users of the other devices and that is based at least in part on an amount, associated with a request from the user of the user device, and included in the data associated with the user.

Although FIG. 5 shows example blocks of process 500, in some implementations, process 500 may include additional blocks, fewer blocks, different blocks, or differently arranged blocks than those depicted in FIG. 5. Additionally, or alternatively, two or more of the blocks of process 500 may be performed in parallel.

The foregoing disclosure provides illustration and description, but is not intended to be exhaustive or to limit the implementations to the precise forms disclosed. Modifications may be made in light of the above disclosure or may be acquired from practice of the implementations.

As used herein, the term "component" is intended to be broadly construed as hardware, firmware, or a combination of hardware and software. It will be apparent that systems and/or methods described herein may be implemented in different forms of hardware, firmware, and/or a combination of hardware and software. The actual specialized control hardware or software code used to implement these systems and/or methods is not limiting of the implementations. Thus, the operation and behavior of the systems and/or methods are described herein without reference to specific software code—it being understood that software and hardware can be used to implement the systems and/or methods based on the description herein.

As used herein, satisfying a threshold may, depending on the context, refer to a value being greater than the threshold, greater than or equal to the threshold, less than the threshold, less than or equal to the threshold, equal to the threshold, not equal to the threshold, or the like.

Although particular combinations of features are recited in the claims and/or disclosed in the specification, these combinations are not intended to limit the disclosure of various implementations. In fact, many of these features may be combined in ways not specifically recited in the claims and/or disclosed in the specification. Although each dependent claim listed below may directly depend on only one claim, the disclosure of various implementations includes each dependent claim in combination with every other claim in the claim set. As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiple of the same item.

No element, act, or instruction used herein should be construed as critical or essential unless explicitly described as such. Also, as used herein, the articles "a" and "an" are intended to include one or more items, and may be used interchangeably with "one or more." Further, as used herein, the article "the" is intended to include one or more items referenced in connection with the article "the" and may be used interchangeably with "the one or more." Furthermore, as used herein, the term "set" is intended to include one or more items (e.g., related items, unrelated items, or a combination of related and unrelated items), and may be used interchangeably with "one or more." Where only one item is intended, the phrase "only one" or similar language is used. Also, as used herein, the terms "has," "have," "having," or the like are intended to be open-ended terms. Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

What is claimed is:

1. A system for conveying information to one or more other devices using audio, the system comprising:
   one or more memories; and
   one or more processors, communicatively coupled to the one or more memories, configured to:
      modify a digital representation of an audio clip to encode, within the digital representation, a first portion of information and a second portion of information for transmission to the one or more other devices;
      transmit, to a remote server, an indicator of an association between the modified digital representation and the first portion of information and the second portion of information;
      use at least one speaker associated with the system to play audio, based on the modified digital representation, for recording by the one or more other devices; and
      receive, from the remote server and based on the at least one speaker playing the audio, a confirmation that users associated with the one or more other devices have performed an action based on the first portion of information and the second portion of information.

2. The system of claim 1,
   wherein the one or more processors are further configured to:
      transmit, to the remote server:
         a copy of the modified digital representation, and
         a copy of the first portion of information and the second portion of information.

3. The system of claim 1,
   wherein the one or more processors are further configured to:
      select the audio clip based on a preference associated with a user of the system.

4. The system of claim 3,
   wherein the one or more processors, to select the audio clip based on the preference associated with the user, are configured to:
      display, to the user, visual indicators associated with a plurality of audio clips;
      receive, from the user, a selection of the audio clip from the plurality of audio clips; and
      store the selection as the preference associated with the user.

5. The system of claim 3,
   wherein the one or more processors, to select the audio clip based on the preference associated with the user, are configured to:
      receive, from the user, at least one file encoding the selected audio clip; and
      store, as the preference, an indicator associated with the at least one file.

6. The system of claim 3,
   wherein the one or more processors are further configured to:
      transmit, to the remote server, an indication of the selected audio clip.

7. The system of claim 3,
   wherein the one or more processors, to select the audio clip based on the preference associated with the user, are configured to:

transmit, to the remote server, a request for the preference associated with the user, wherein the request includes at least one credential associated with the user; and receive, from the remote server and based on the request, an indication of the preference associated with the user.

8. The system of claim 1, wherein the one or more processors, to modify the digital representation, are configured to:

apply a wavelet transform to obtain a spectrogram associated with the audio clip;

select one or more subbands within the spectrogram that satisfy a threshold; and embed a vector, encoding the first portion of information and the second portion of information.

9. A method of conveying information to one or more other devices using audio, comprising:

modifying, at a device, a digital representation of an audio clip using at least one encoding algorithm to encode data associated with a user of the device for transmission via sound;

transmitting, to a remote server, an indication of the at least one encoding algorithm;

using at least one speaker associated with the device to play audio, based on the modified digital representation, for recording by the one or more other devices; and receiving, from the remote server and based on the at least one speaker playing the audio, a confirmation that users associated with the one or more other devices have performed an action based on the data associated with the user of the device.

10. The method of claim 9, further comprising:

transmitting, to the remote server, an indication of the audio clip and the data associated with the user of the device.

11. The method of claim 9, wherein the data associated with the user of the device is based, at least in part, on received input that triggers transmission of information via sound.

12. The method of claim 9, further comprising:

selecting the audio clip, from a plurality of stored audio clips, based on a setting associated with the device.

13. The method of claim 12, further comprising:

displaying information associated with the plurality of stored audio clips;

receiving, at the device, a selection of the audio clip from the plurality of stored audio clips; and storing, on the device, the selection as the setting associated with the device.

14. The method of claim 13, further comprising:

transmitting, to the remote server, an indication of the selected audio clip.

15. The method of claim 9, wherein the at least one encoding algorithm comprises:

a tone insertion algorithm associated with inserting a tone within the audio clip, wherein the tone encodes the data associated with the user of the device, and wherein a frequency range associated with the tone is not within a range of frequencies associated with human hearing;

a phase coding algorithm associated with shifting one or more initial phases corresponding to one or more segments of the audio clip, wherein one or more additional phases included in each segment are shifted to maintain a relative difference with the initial phase for the segment; or a discrete wavelet transform associated with embedding one or more vectors, that encode the data associated with the user of the device, within one or more subbands associated with the audio clip.

16. A non-transitory computer-readable medium storing a set of instructions for conveying information to at least one other device using audio, the set of instructions comprising:

one or more instructions that, when executed by one or more processors of a device, cause the device to:

modify a digital representation of an audio clip to encode data, associated with a user of the device, within the digital representation;

transmit, to a remote server, an indicator of an association between the modified digital representation and the data;

use at least one speaker associated with the device to play audio, based on the modified digital representation, for recording by the at least one other device; and receive, from the remote server and based on the at least one speaker playing the audio, a confirmation that at least one user associated with the at least one other device has performed an action based on the data.

17. The non-transitory computer-readable medium of claim 16, wherein the digital representation includes at least one of a spectrogram, a phase matrix, or a discretized signal.

18. The non-transitory computer-readable medium of claim 16, wherein the one or more instructions, when executed by the one or more processors, further cause the device to:

authenticate the device with the remote server, wherein transmitting to the remote server is based on authenticating the device with the remote server.

19. The non-transitory computer-readable medium of claim 16, wherein the one or more instructions, when executed by the one or more processors, further cause the device to:

use the at least one speaker to halt playing of the audio; and transmit, to the remote server and in association with halting playing of the audio, an indication to remove the association between the modified digital representation and the data.

20. The non-transitory computer-readable medium of claim 16, wherein the one or more instructions, that cause the device to modify the digital representation, cause the device to:

generate a plurality of bits; and modify the digital representation to encode the plurality of bits, wherein the plurality of bits are associated with the data.

\* \* \* \* \*